Jan. 13, 1953  T. J. RHODES  2,624,914
PLASTIC SPREADING METHOD AND APPARATUS
Filed Nov. 1, 1949  4 Sheets-Sheet 1
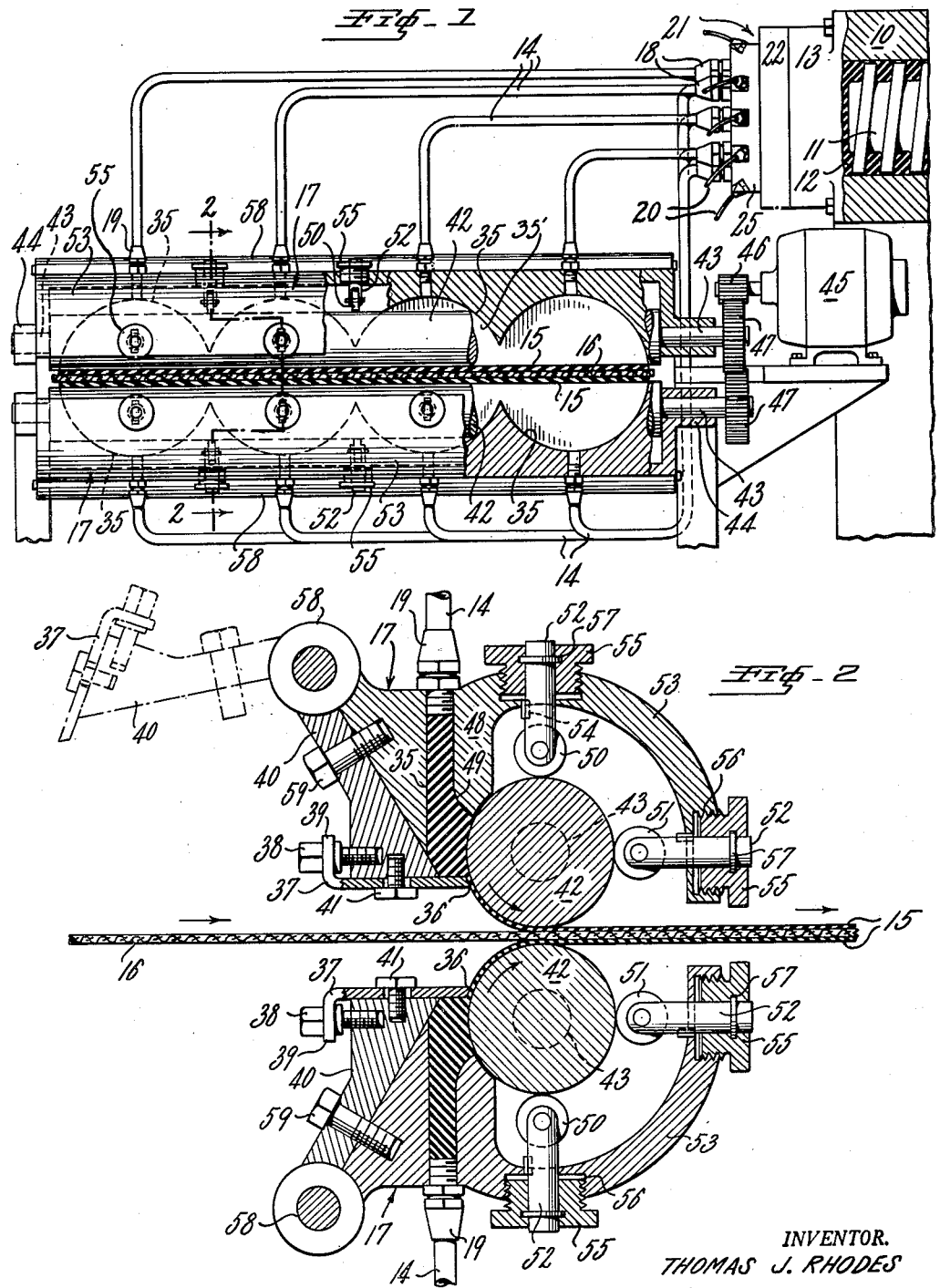
INVENTOR.
THOMAS J. RHODES
BY William H. Epes
ATTORNEY

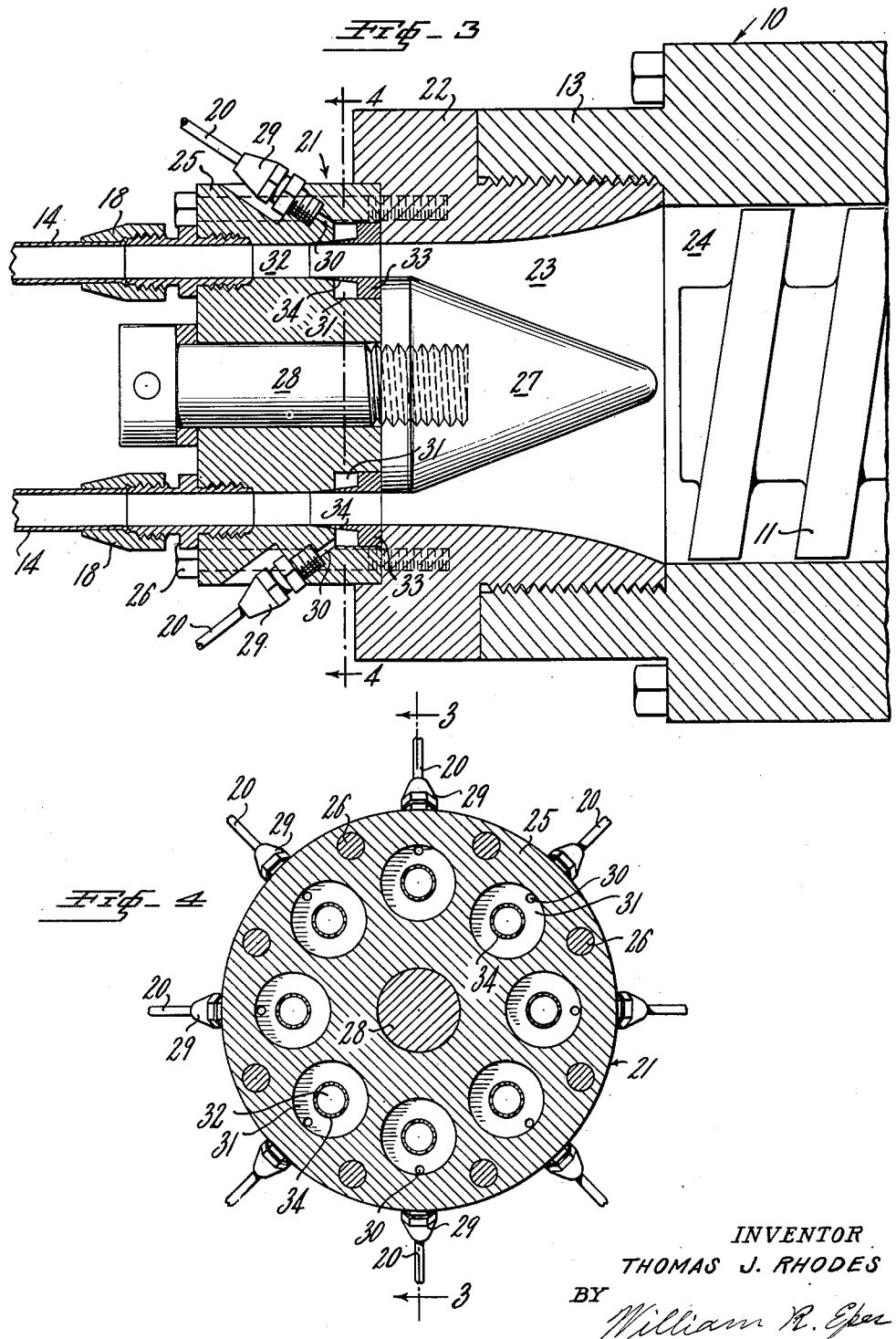

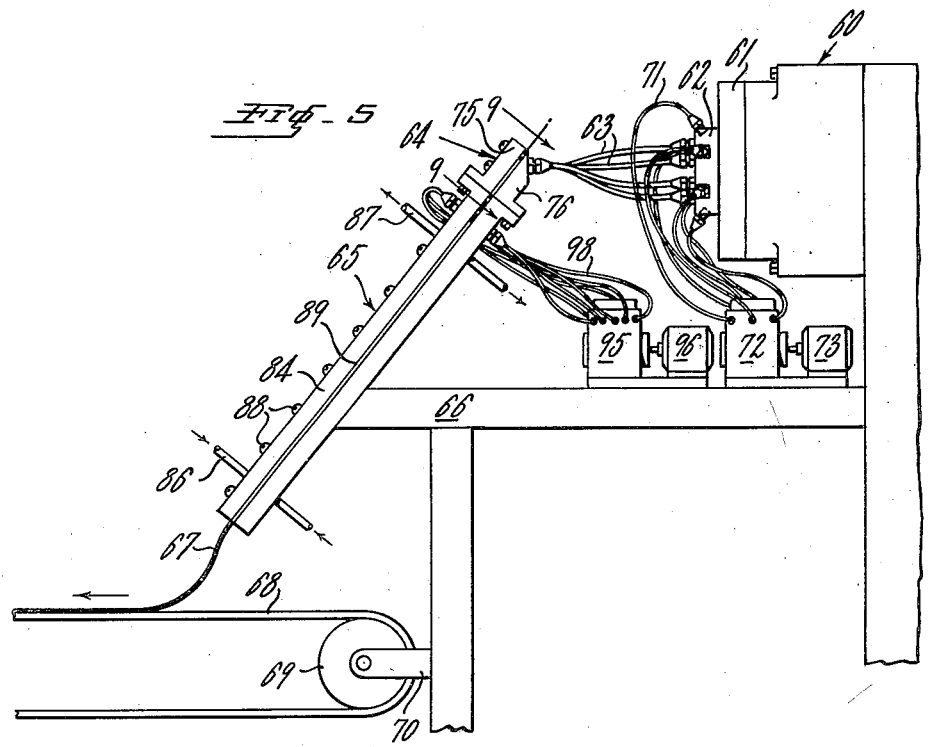
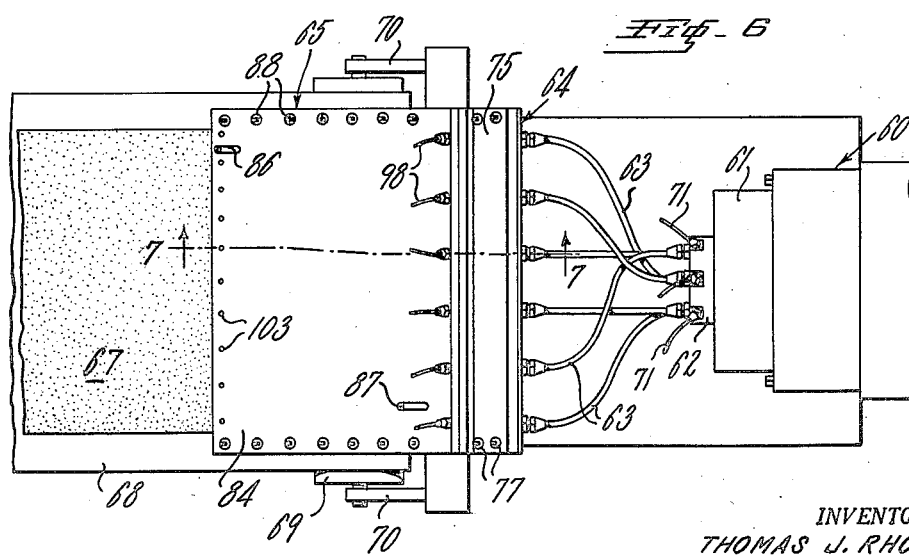

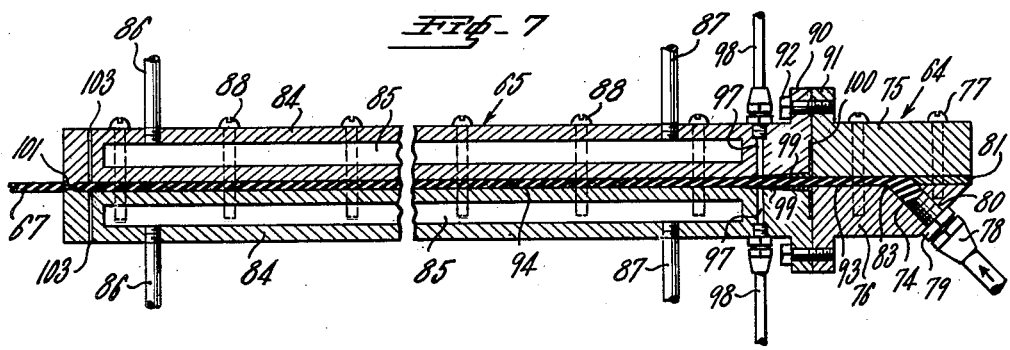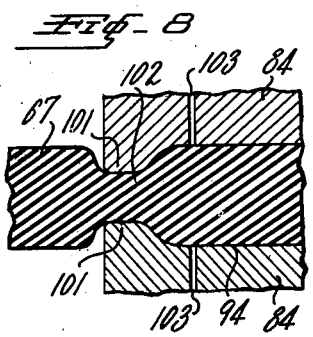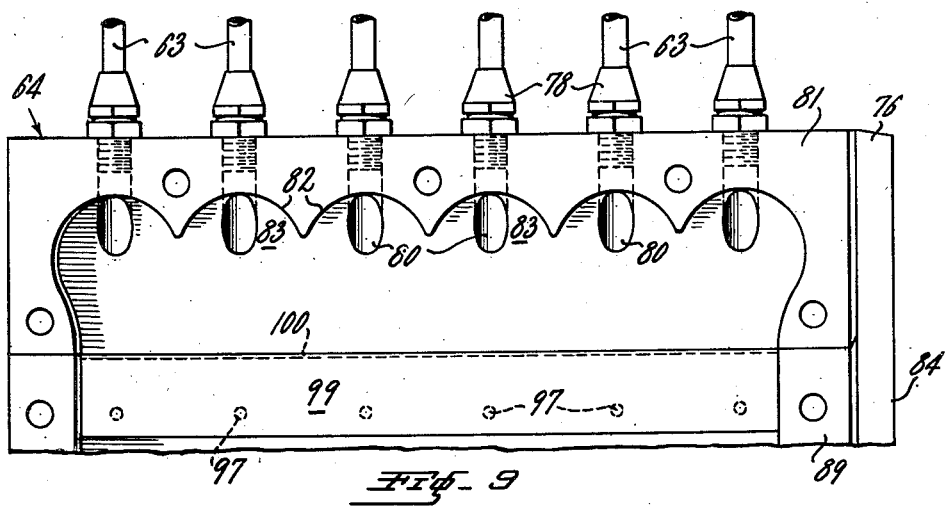

Patented Jan. 13, 1953

2,624,914

UNITED STATES PATENT OFFICE 2,624,914

PLASTIC SPREADING METHOD AND APPARATUS

Thomas J. Rhodes, Clifton, N. J., assignor to United States Rubber Company, New York, N. Y., a corporation of New Jersey Application November 1, 1949, Serial No. 124,827

14 Claims. (Cl. 18—12)

This invention relates to an improved method and apparatus for shaping plastic products. More particularly, it relates to an improved method and apparatus for extruding relatively thin shapes, such as thin sheets, of plastic material having extremely high viscosity, such as rubber stocks and the like.

Heretofore, highly viscous stock could be formed into thin sheets and similar shapes, especially relatively wide sheets, only by employing extremely heavy and expensive machinery, such as calenders. For example, the calenders conventionally used to skim coat rubber on fabric may consist of very large machines containing four rolls 3 feet in diameter, and representing an investment of several hundred thousand dollars or more. It has been desired to simplify the machines required to spread rubber and other viscous plastics into thin shapes, but limitations introduced by the physical properties of the plastics, especially the high viscosity and the high coefficient of friction thereof, have made it impractical to do so by known methods. Thus, if it is attempted to extrude a stream of rubber into the form of a sheet through a conventional spreading die, it is observed that, in practice, the rubber cannot be spread out by a ratio of more than about 4 to 1, that is, the maximum width of the exit orifice of the spreading die cannot be more than about 4 times the width of the entrance to the die, otherwise prohibitively high extrusion pressures are required, and uneven, poorly shaped sheets are obtained, due principally to the high viscosity of the rubber and the high frictional forces between the surface of the rubber and the surface of the die. Also, the thinner the gauge of the desired rubber shape, the more difficult the spreading operation becomes.

I have now found that highly viscous plastic materials can be spread into thin shapes with greater ease and effectiveness than has heretofore been possible, by first extruding the plastic material in a preliminary stream of easily extrudable shape, applying to this preliminary stream a thin film of liquid lubricant and thereafter passing the lubricated preliminary stream through a spreading die in which the plastic material is spread out into a thin sheet. Means is provided for controlling the rate of emergence of the thin sheet from the spreading die, so that substantial pressure is maintained on the plastic material within the spreading die, and this feature, in conjunction with the fact that the preliminary stream has liquid lubricant on its surface, makes it possible to spread the highly viscous stock out to a substantially greater extent than has been possible with prior art extrusion methods, and at the same time to obtain a dense, smooth surfaced, uniformly shaped article of accurately controlled thickness. The lubricant which I apply to the plastic stream is a liquid substance which is miscible with, and not deleterious to, the plastic material, so that it becomes incorporated in the plastic material during the course of the extrusion operation. A miscible lubricant is used prior to the spreading of the stream of rubber because the lubricant may be mixed to some extent with the plastic when turbulence in the surface of the plastic is caused by such spreading or otherwise. In that case the mixed miscible lubricant may be absorbed by the plastic and permit it to knit together, forming a uniform product free from irregularities or discontinuities.

In a preferred form of my invention, the plastic material is first extruded under pressure from a pressure chamber, which is usually a conventional screw extruder, into a plurality of continuously lubricated distributing conduits which are arranged in diverging spaced relation. Streams of the plastic material flow through the lubricated distributing conduits, and are fed therefrom into a common spreading die or header, that is, a passageway or conduit in which the individual lubricated plastic streams are spread out greatly and flow together into a single thin shape. The rate of discharge of the thin shape from the common header is controlled so that substantial extrusion pressure is maintained within the spreading die on common header, thereby insuring formation of a smooth, dense shape, free from voids or discontinuities. In this way thin sheets and the like of extremely great width can be formed, because the lubricated distributing conduits can supply a relatively long common header with plastic stock at moderate extrusion pressures.

In one of the embodiments of my invention disclosed in detail herein and intended especially for use with vulcanizable rubber stocks or other thermosetting plastic materials, means is provided for continuously vulcanizing or curing the thin shape under pressure. For this purpose, the common header in which the thin shape is formed is connected to a relatively long curing or confining conduit, having a passageway of essentially the same cross-sectional size and shape as the thin shape being extruded. The thin shape passes into this confining conduit, and additional lubricating means is provided for maintaining a thin film of liquid lubricant on the surface of the thin plastic shape as it passes through the confining conduit. The lubricant so applied is not miscible with the plastic and remains on the surface thereof throughout the passage of the shape through the conduit. Means is provided for heating the plastic within the confining conduit to vulcanizing temperatures, and the conduit is made sufficiently long so that the advancing plastic shape is confined therein at elevated temperature for a sufficient length of time to become at least partially cured. In this form of the invention, the means for controlling the rate of discharge of the thin shape is usually a suitable snubbing device, such as a constriction, located at the discharge end of the curing conduit, so that substantial extrusion pressure is maintained on the plastic within the curing conduit, and a dense cure is insured.

Another embodiment of the invention disclosed in detail herein is particularly adapted for coating a thin sheet of plastic onto a base material, usually a flexible base, as typified by the skim coating of rubber onto fabric. In this form of the invention, the spreading die or common header is provided at its discharge orifice with a driven pinch roll that controls the rate of the emergence of the thin sheet of plastic as well as the thickness thereof. Means is provided for feeding the base material into pressurized contact with the thin plastic sheet as it passes before the pinch roll. One of such discharge header and pinch roll arrangements is usually provided on either side of the base material, so that both sides thereof are skim coated simultaneously in a single pass through the apparatus.

These embodiments of the invention will be described in detail with reference to the extrusion of vulcanizable rubber stock, but it will be understood that the invention is applicable to other highly viscous plastic stocks.

The foregoing embodiments of the invention are disclosed in the accompanying drawings, in which Fig. 1 is a plan view, with parts broken away, of an extrusion apparatus constructed according to the invention for skim coating a thin coating of rubber on each side of a textile fabric;

Fig. 2 is a sectional view on a larger scale of part of the apparatus of Fig. 1, taken along the lines 2—2 of Fig. 1, and showing the manner in which a thin coating of rubber is extruded onto each side of the fabric;

Figs. 3 and 4 are enlarged sectional views of the extruder head taken along lines 3—3 and 4—4 respectively, as indicated in the figures;

Fig. 5 is an elevation of a modification of the invention for extruding a thin rubber sheet through a heated conduit wherein the sheet becomes vulcanized;

Fig. 6 is a plan view of the apparatus of Fig. 5;

Fig. 7 is a sectional view on a larger scale of the vulcanizing conduit taken along the line 7—7 of Fig. 6;

Fig. 8 is a detailed view showing how the vulcanized rubber sheet emerges from the vulcanizing conduit; and, Fig. 9 is a sectional view of the entrance to the vulcanizing conduit taken along the line 9—9 of Fig. 5.

Referring to Fig. 1 of the drawings the apparatus for skim coating fabric comprises a conventional extruder 10 having a rotating feed screw 11 for advancing highly viscous plastic stock, for example, vulcanizable rubber stock 12, under pressure. In order to spread the rubber out into a thin shape of far greater width than could be extruded by conventional apparatus, the extruder delivery head 13 is provided with a plurality of diverging distributing conduits 14 which divide the rubber stock 12 passing from the extruder 10 into a plurality of advancing streams of rubber. In order to shape the advancing streams of rubber into the form of a thin sheet or coating 15 and to apply such thin sheet onto each side of a continuously advancing textile fabric base 16, best seen in Fig. 2, there are provided upper and lower spreading dies or headers 17, into which the distributing conduits 14 feed the streams of rubber stock under pressure at spaced points.

The distributing conduits 14 are attached to the extruder head 13 and to the upper and lower spreading dies 17. The conduits are preferably attached by means of detachable connections, such as threaded couplings 18 and 19. In order that the rubber stock 12 may move freely through the distributing conduits 14, and in order that the rubber streams in the conduits 14 may be delivered to the various points along the spreading dies 17 at substantially the same pressure, means is provided for minimizing the resistance to flow of rubber stock in the conduits 14. Such means include a source (not shown) for delivering a liquid lubricating substance under positive pressure to a plurality of lubricant delivery lines 20 that lead into a distributing die assembly 21 at which the distributing conduits 14 are connected to the extruder head 13. The distributing die assembly 21, best seen in Figs. 3 and 4, comprises a bushing 22 threaded into the extruder head 10 and containing a flared approach passageway 23 for conducting the rubber stock 12 from the extruder pressure chamber 24 (Fig. 3) to a multiple die block 25 to which the distributing conduits 14 are secured by threaded couplings 18. The multiple die block 25 is secured to the bushing 22 by means of bolts 26. The inner face of the multiple die block 25 carries a conical block 27, held concentrically of the bushing 22 and secured to the die block 25 by a bolt 28, and tapered inwardly toward the extruder screw 11. The conical block 27 serves to make the approach passageway 23 more streamlined, by eliminating a dead space within the passageway, wherein the heat-sensitive rubber stock 12 might otherwise lodge and become precured or scorched, due to the fact that the extruder 10 is heated by conventional means (not shown) in order to facilitate the extrusion of the stock.

Turning now to the details of the means by which the liquid lubricant, fed by lines 20, is applied to the rubber streaming into the distributing conduits 14, it will be noted in Figs. 3 and 4 that the inlet lines 20 are connected by suitable threaded couplings 29 to internal inlet passageways 30 and recesses 31 located at the entrance to each of the multiple die passageways 32 within the multiple die block 25. In order to distribute a thin uniform continuous film of lubricant onto the surface of the passing rubber stream, and in order to prevent the rubber stock from entering the lubricant delivery passageways, there is provided in each of the recesses 31, a lubricant distributing member comprising a retaining ring 33 which fits snugly in the recess 31 and has an annular lubricant applicator sleeve 34 extending forwardly therefrom into the die passageway 32. The pressure exerted by the liquid lubricant within the recess 31 causes a thin film of lubricant to pass out through a very fine clearance provided between the forward end of the applicator sleeve 34 and the wall of the die passageway 32 onto the surface of the passing rubber.

The lubricant employed may be any liquid substance which is not deleterious to the rubber, or to the particular plastic stock being extruded, and which is miscible therewith. A miscible lubricating substance is employed because the lubricant becomes mixed in with the stock within the spreading die 17, and in order to avoid discontinuity or improper knitting of the stock into a continuous uniform sheet 15, it is necessary that the lubricant become dissolved or uniformly dispersed through the stock. When the plastic stock is vulcanizable rubber stock, I prefer to employ a solution of rubber as the lubricant, usually in the form of a conventional solvent cement, such as a solution of rubber in benzene having a viscosity, for example, of about 1100 Saybolt seconds at room temperature, although other cements or other liquids having lubricating properties may be employed, such as paraffin oil, glue solutions, etc.

Considering now the details of the structure of the spreading die member 17 and the associated parts for forming the rubber into thin sheets 15 and for applying the sheets to the fabric base 16, there is provided within each spreading die 17 a plurality of fan shaped spreading conduits 35 (Fig. 1) each of which is supplied with a lubricated stream of rubber stock by one of the spaced distributing conduits 14. The spreading conduits 35 are preferably made generally fan-shaped with diverging side walls 35' in order that there will be no dead spots within the spreading passageways and all of the rubber passing therethrough will become spread out in a more or less streamline fashion.

The rubber stock is fed from the spreading conduits 35 through a common extrusion orifice 36 (Fig. 2) in the form of a sheet or film 15. In order to adjust the orifice 36 for the extrusion of sheets of various thicknesses, there is provided at the exit end of the die 17 an adjustable plate 37, which may be moved toward or away from the orifice 36 to change the width thereof by turning adjusting screws 38 which pass through a flange 39 on the plate 37 and are threaded into a gate 40 hinged on the body of the die member 17 for this purpose. The plate 37 may be fixed rigidly in any desired position by tightening a lock screw 41 which is also threaded into the body of the die 17.

The exit orifice of each die 17 has in close engagement therewith a driven roller 42 which performs a number of functions. Each roller 42 rotates on a shaft 43 which passes through suitable bearings 44 carried by the casing of the die 17. The rollers are driven by a motor 45 through a suitable pinion 46 and gears 47 in such a direction that the surface of each roller in contact with the rubber stock 12 moves in the same direction as the advancing rubber stock. The forward portion 48 of the casing of the die member 17 is cut away at 49 as shown in Fig. 2, so that a portion of the roller engages the rubber within the fan shaped spreading passages 35. The rotation of the roller 42 aids in causing the rubber to spread out into the form of a sheet, and at the same time the rotation aids in controlling the rate of emergence of the rubber from the orifice 36. In this way, the rotation of the roller exerts a controlling influence on the pressure on the stock within the spreading passages 35. This pressure must be maintained at a substantial level in order that the rubber stock will completely fill out the passages 35 and emerge therefrom as a uniform dense sheet free from irregularities. The faster the roller 42 rotates, the lower will be the extrusion pressure within the passages 35, and conversely, slow speeds of rotation will tend to increase the pressure.

The rollers 42 also exert control over the extrusion pressure in another fashion, by reason of the fact that means is provided for making slight vertical and horizontal adjustments in the position of the rollers at spaced points along their length, and this feature also permits of the closest control of the gauge of the film or sheet 15. Such adjusting means comprises a series of spaced vertically adjustable back-up rollers 50 and horizontally adjustable back-up rollers 51 which ride up against the main rollers 42 and exert adjusting pressure thereon. The back-up rollers are rotatably supported on adjusting rods 52 passing through forwardly curved casing members 53 extending from the forward portion 48 of the spreading die member 17. The supporting rods 52 are slidably keyed to the casing members 53 by means of keys 54 to prevent rotation thereof, and the rods 52 slide inwardly and outwardly through the casing member upon rotation of an adjusting screw 55 which is threaded into a recess 56 in the casing 53, and which slidably engages a fixed collar 57 on the supporting rod. This arrangement permits precise adjustment of the width of the orifice 36, and hence of the gauge of the extruded sheet 15. This arrangement also provides a means for controlling or changing the shape of the transverse cross-section of the extruded sheet 15 since the rollers 42 are of relatively small diameter with respect to their length, and are therefore capable of flexing slightly when more or less adjusting pressure is exerted thereon by the back-up rollers 50 and 51.

The rollers 42 also perform another important function in that they bring the extruded rubber sheet 15 into contact with the advancing fabric base 16, and apply pressure to the rubber sheets so that they are pressed into and adhere to the fabric. It will be understood that suitable conventional means (not shown) are provided for feeding the fabric 16 to the apparatus and for winding up the skim-coated product, usually with a non-adhesive liner to prevent sticking, or for cutting it into suitable lengths, or otherwise processing it.

In order that the spreading die member 17 may be opened up to make cleaning and inspection of the interior thereof more convenient, I prefer to provide the rearward part of the die 17 with the gate 40 which is hinged to the body of the die 17 by a hinge joint 58. The gate 40 is normally held in closed position by bolts 59 extending through the gate 40 and threaded into the body 17 of the die as shown in Fig. 2. The bolts 59 may be loosened for the purpose of permitting the gate 40 to swing away on the hinge 58 from the member 17, as indicated by the dotted lines in Fig. 2.

In operation, the plastic rubber stock 12, which it is desired to apply to either side of a relatively wide textile fabric base 16 in the form of thin skim coats 15, is fed under pressure by rotation of the feeding screw 11 in the extruder 10, through the approach passageway 23 (Fig. 3) in the extruder head into multiple die passages 32 in the multiple die piece 25. As the rubber stock streams into the die passageways 32, a liquid lubricant which is miscible with the rubber stock is supplied thereto through lubricant inlet tubes 20 and inlet passages 30 and 31. A small amount of the lubricant emerges at the tip of the lubricant applicator sleeve 34 forming a thin lubricating film on the surface of the stock as it passes through die passageways 32 into distributing conduits 14.

The distributing conduits 14 lead the rubber from the extruder head into spaced points along the length of relatively wide upper and lower spreading dies 17. The rubber stock is spread out greatly in fan shaped conduits 35 within the spreading die 17, and emerges therefrom through orifices 36 in the form of thin uniform sheets. The extruded sheets 15 are pressed into firm contact with the advancing fabric base 16 as the sheets and fabric pass between the rollers 42.

In order to obtain a perfectly uniform gauge across the width of the rubber sheet 15, the pressure exerted by the back-up rollers 50 and 51 on the main rollers 42 may be adjusted by turning adjusting screws 55, thereby causing the roller 42 to flex slightly toward or away from the orifice plate 37, and thereby controlling the width of the orifice 36. For instance, if the center portion of the sheet 15 is running slightly heavy, the adjusting screws 55 in the area of the center of the sheets are turned so as to move the vertical back-up rollers 50 downwardly and the horizontal back-up rollers 51 inwardly, thus flexing the rollers 42 and narrowing the orifice 36 in that area.

From the foregoing, it is seen that this embodiment of the invention provides a means for skim coating rubber and similar material, particularly onto flexible bases, in the form of an apparatus which is simpler, more compact, and less expensive than the huge four roll calenders commonly used for this purpose. Because provision is made for distributing the plastic stock through a plurality of lubricated diverging conduits, the stock can be spread out, under the influence of ordinary extrusion pressures, to a much greater width and to finer gauge than has heretofore been possible by conventional extrusion methods. Spreading ratios of 10 to 1 are readily obtainable by this method, whereas conventional extrusion methods are limited to a spreading ratio of about 4 to 1 as a maximum. Gauges as low as 0.008" are readily obtainable, whereas conventional extrusion operations on the usual rubber stocks are generally limited to about 0.020" as a minimum. Wide sheets of uniform gauge can be produced readily by this method because the lubrication feature reduces the resistance to flow of plastic stock to the point where the pressure drop on the plastic as it passes through the distributing conduits is relatively small. For this reason, the plastic can be supplied at spaced points along a wide common spreading die at substantially equal pressure, and the sheet which emerges therefrom therefore has a more uniform thickness than would otherwise be possible. The uniformity of the emerging sheet is also made possible by the fact that means is provided at the exit of the spreading die for controlling the flow therethrough. The most precise control of the gauge of the extruded sheet across the width thereof is made possible by providing, in engagement with the extrusion orifice, a roller of relatively small diameter which can be adjusted along its length so as to vary the width of the extrusion orifice. As far as is known, such precise control of the gauge of plastic sheets has not heretofore been possible because conventional large diameter calender rolls permit no such adjustments. Calender rolls are conventionally ground to have a certain "crown" which compensates to a degree for the normal tendency of calendered sheet to vary in gauge across its width, but such crown, once imparted to the calender rolls, cannot be changed except at great expense, and this type of compensation is not well suited to different types of stock, or different operating conditions. My gauge adjusting means, in contrast to this, can be changed easily at any point along the width of the sheet even while the machine is in operation, to compensate for the normal time to time variation in the character of the stock, temperature of operation, etc.

The embodiment of the invention shown in Figs. 5 to 9 inclusive for the extrusion of vulcanized rubber sheet will now be described in detail. Referring to Fig. 5, the apparatus comprises a conventional extruder 60 having on its discharge head 61 a multiple lubricated die assembly 62 of the same character as that illustrated in Figs. 3 and 4 and described in detail previously. Diverging conduits 63 distribute lubricated streams of rubber stock to spaced points across the width of a relatively wide common spreading die 64, whence the rubber stock passes through a heated confining chamber 65, which is supported on a suitable frame 66, and from which the stock emerges in the form of a vulcanized rubber sheet 67. The vulcanized rubber sheet 67 may be carried away as it is produced on a suitable conveyor 68 passing around a rotatable pulley 69, which is also suitably supported on the frame 66 by horizontally extending supporting arms 70. The conveyor may be driven by conventional means (not shown).

A liquid lubricant miscible with the rubber stock in the die assembly is introduced to the multiple die assembly 62 in the same manner as previously described in connection with Figs. 3 and 4. Such liquid lubricant is supplied to the die assembly 62 through delivery lines 71 from a positive delivery pump 72 of conventional construction driven by a motor 73.

Referring to Figs. 7 and 9, the common spreading die 64, into which the lubricated streams of rubber stock 74 are fed at spaced points by the distributing conduits 63 comprises upper and lower die plates 75 and 76 respectively, held together by screws 77 extended through one plate and threaded into the other. The conduits 63 are detachably secured to the lower plate 76 by threaded couplings 78 and nipples 79, which are threaded into oblique entrance passageways 80 in the lower die plate 76. A thin spacer plate or gasket 81 interposed between the die plates 75 and 76 holds the said plates spaced apart a distance corresponding essentially to the thickness of the desired rubber sheet 67. The spacer 81 has cut-outs or scallops 82 therein to provide the desired fan-shaped passageways 83 (Fig. 9) in which the rubber stock 74 is spread out as it passes out of entrance passageways 80 into the common die 64.

The confining or vulcanizing conduit 65 comprises elongated upper and lower plates 84 each having an internal chamber 85 running the length thereof, through which steam or other heating medium may be circulated by means of entrance pipes 86 and exit pipes 87. The two plates 84 are secured together by screws 88. A spacer plate 89 (Figs. 1 and 9), of the same thickness as die spacer plate 81 maintains the vulcanizing chamber plates 84 spaced apart by a distance equal to the thickness of the extruded sheet 67. The vulcanizing conduit 65 is secured to the spreading die 64 by clamping their respective flanges 90 and 91 together with screws 92 (Fig. 7). The exit passage 93 of the spreading die 64 and the vulcanizing passage 94 within the conduit 65 thus form a continuous smooth path for the rubber stock 74.

Since the lubricant introduced onto the surface of the passing rubber stock at the multiple die assembly 62 is miscible with the rubber stock, it has become largely intermixed with the stock by the time the stock leaves the exit passageway 93 of the spreading die 64. In order to make it possible for the rubber stock to traverse the elongated vulcanizing passageway 94 in the vulcanizing conduit 65, it is necessary to apply additional lubricant to the surface of the shaped stock as it enters the passageway 94. Since the rubber stock has already been shaped in the desired sheet form by the spreading die 64, the lubricant introduced at the entrance of vulcanizing passageway 94 may be a liquid which is not miscible with the rubber stock, and, in fact, the lubricant is most preferably such a non-miscible liquid in order to insure maintenance of a continuous thin film on the surface of the rubber sheet throughout its traversal of the heated passageway 94.

Such non-miscible lubricant, for example non-miscible oil, glycerin, or silcone mold release fluid, is introduced to the surface of the shaped rubber stock near the entrance of passage 94 by means of a conventional lubricant pump 95 (Fig. 5) driven by a motor 96 and feeding small spaced inlet passageways 97 in each of the conduit plates 84 (Figs. 7 and 9) by means of a multiplicity of lubricant lines 98. For the purpose of spreading the lubricant out into a thin continuous film on the surface of the rubber, and preventing the rubber from entering the lubricant inlets 97, a relatively thin forwardly tapered applicator blade 99 is affixed to each side of the passageway 94. The blades 99 extend across the passageway 94 and forwardly from the entrance thereof over the lubricant inlet holes 97. The lubricant flows from inlet holes 97 and passes out under the applicator blades 99 onto the surface of the passing rubber stock. The applicator blades 99 extend from retaining flanges 100, and are secured in position in suitable recesses in the plates 84 when the die 64 and the conduit 65 are fastened together by the screws 92.

In order to maintain substantial extrusion pressure on the rubber stock, particularly within the fan shaped passageways 83 and the vulcanizing passageway 94, so that a dense uniform vulcanized rubber sheet 67 free from voids and irregularities will be formed, it is necessary to provide means for restricting the flow of the rubber sheet 67 from the exit end of the vulcanizing conduit 65. For this purpose, the exit ends of the plates 84 are provided with transverse ridges 101 (Fig. 8) extending the width of the passageway 84, so that the exit orifice 102 thereof is considerably constricted, typically to about one-half the thickness of the extruded sheet 67. Upon emerging from this constricted orifice 102, the vulcanized rubber sheet 67 recovers to the original thickness imparted to it within the die passageway 93 and the vulcanizing passage 94 as shown in Fig. 8.

In order to permit escape of the non-miscible lubricant introduced to the surface of the passing rubber at the entrance to passage 94, there is provided in each of the plates 84 a series of small spaced escape orifices 103, located just before the constricted exit orifice 102 (Figs. 6 and 8).

In operation, vulcanizable rubber stock is extruded from the extruder 60 through the multiple die assembly 62 into the multiple distributing conduits 63. As the rubber streams through the multiple die 62, a miscible lubricating liquid is applied to the surface thereof by means of lubricant pump 72 and lubricant lines 71 in the form of a thin film which permits the rubber to pass through the distributing conduits 63 without substantial loss of extrusion pressure. The rubber passes from conduits 63 into the common spreading die 64 where the rubber is spread out in generally fan shaped passageways 83. This miscible lubricant becomes largely mixed in with the rubber stock 74 at this point. The rubber passes from the spreading die 64 in the form of a thin sheet into the elongated confining passageway 94 within the heated vulcanizing conduit 65. A thin film of non-miscible liquid lubricant is applied continuously to the surface of the advancing rubber sheet as it passes into passageway 94 by means of the lubricant pump 95 and the multiple lubricant lines 98. As the vulcanized rubber sheet 67 emerges from the vulcanizing conduit 65 it is snubbed in constricted orifice 102 in order to maintain substantial extrusion pressure within the vulcanizing conduit 65 and the spreading die 64. The non-miscible lubricant escapes through small openings 103 provided near the end of the vulcanizing conduit 65 for this purpose.

The number of conduits 63 may be varied as desired, depending on the desired width of the extruded sheet. In the case of relatively narrow strips a single conduit 63 may suffice.

From the foregoing, it is evident that this form of the invention provides a convenient means for the continuous manufacture of wide sheets of vulcanized rubber, or other vulcanizable or thermosetting plastic materials. The process is continuous and provides a finished product of high quality in a continuous operation. The process provides an extremely smooth finish on the extruded sheet, because the sheet is vulcanized while confined under pressure in the desired shape within a lubricated chamber. In fact, the finish is superior to that obtained by manufacture of vulcanized rubber sheets in the conventional drum and belt type of continuous vulcanizing apparatus. Sheets of virtually any desired thickness can be produced simply by changing the spacers which separate the die parts and the vulcanizing conduit parts. With conventional calendering methods inconvenient and time consuming laminating steps are often necessary to produce various thicknesses. The spreading die and curing chamber may be given various desired cross-sectional shapes to produce such articles as rubber matting with a ribbed surface, or other plastic articles besides flat sheets.

The gauge of the extruded sheet or other article made by this method is extremely accurate, since the plastic stock is cured or set within a confining chamber under pressure. This confining feature may be utilized to extrude wide relatively thin articles of accurate gauge, even when the article is not vulcanized within the confining chamber. In such event, the confining chamber need not be heated, and may even be cooled, and it is observed that when the uncured plastic stock emerges therefrom its tendency to "recover" or increase to a cross-sectional size greater than the size imparted to it within the confining chamber due to the property of elastic memory is reduced to a small constant value. The gauge of the stock so extruded is relatively independent of the normal time to time variations in the viscosity of the stock, temperature of extrusion, etc., which ordinarily make it very difficult to continuously extrude a plastic product of constant gauge in conventional apparatus.

Having thus described my invention, what I claim and desire to protect by Letters Patent is:

1. An apparatus for extruding a sheet of plastic comprising a pressure chamber, a plurality of distributing conduits arranged in diverging spaced relation, a plurality of fan shaped conduits, each of said distributing conduits having one end connected to said pressure chamber and the other end connected to one of said fan shaped conduits, a back pressure conduit connected at one end to the larger end of said fan shaped conduits, and said back pressure conduit having a transverse cross-section of substantially the shape of the transverse cross-section of the sheet to be extruded.

2. Extrusion apparatus comprising a stuffer for advancing plastic material under pressure, a conduit for conducting the advancing plastic material away from said stuffer, means for applying a thin film of lubricant to the surface of the advancing plastic material as it streams through said conduit, a spreading die having a spreading conduit therein connected to the delivery end of said first conduit, said spreading conduit having oppositely disposed side walls diverging in the advancing direction of said plastic and merging into other walls defining said spreading conduit in which the lubricated stream of advancing plastic material is spread out into a relatively thin shape, said spreading conduit having a discharge opening of relatively great width compared to its entrance opening, and means for restricting the flow of plastic material from said spreading conduit, whereby substantial pressure is maintained on the plastic material within said spreading conduit.

3. Extrusion apparatus for shaping plastic material into relatively wide sheets comprising a stuffer for advancing the plastic material under pressure, a head at the discharge end of said stuffer having a plurality of orifices for dividing the advancing plastic material into a plurality of streams, a spreading die, a plurality of diverging conduits connected at one end to said orifices and at the other end to fan-shaped passages in said spreading die, means for lubricating the surfaces of said streams before they enter said spreading die, said fan shaped passages having a common outlet, and means for restricting the flow of the plastic material out of said outlet, and thereby maintaining sufficient back pressure on said plastic material in said spreading die to cause said separate streams to unite into a unitary wide sheet.

4. Apparatus for extruding and vulcanizing rubber stock comprising a stuffer for advancing vulcanizable rubber stock under pressure, a head on said stuffer having a plurality of orifices for dividing the advancing rubber stock into a plurality of streams, means for applying a thin film of lubricant to the surfaces of the said rubber streams, a plurality of distributing conduits for the rubber streams leading from said orifices, said conduits diverging in spaced relation, a spreading die for receiving the advancing rubber stock from said conduits and for spreading the stock out into a relatively thin shape, a curing chamber in engagement with said spreading die for receiving the advancing thin rubber shape as it emerges from said die, further lubricating means for applying a thin continuous film of liquid lubricant to the surface of the rubber shape as it advances through the curing chamber, means for applying heat to the rubber shape in said curing chamber, and constricting means at the exit end of said curing chamber for snubbing the advancing thin rubber shape as it emerges therefrom.

5. Extrusion apparatus for skim coating plastic material on a sheet of base material comprising a stuffer for advancing the plastic material under pressure, a head on said stuffer having a plurality of orifices for dividing the advancing plastic material into a plurality of streams, means for applying a thin film of liquid lubricant to the surfaces of the plastic streams, a plurality of distributing conduits for the plastic streams leading from said orifices, said conduits diverging in spaced relation, a spreading die for receiving the advancing plastic material from said conduits and for spreading the material out into a relatively thin sheet, said spreading die having a common orifice from which the thin plastic sheet emerges, a driven pinch roll engaging said orifice for controlling the flow of plastic from the orifice, and means for feeding and advancing sheet of base material into contact with the plastic sheet as it emerges from the orifice, whereby the rubber sheet is skim coated on the base material.

6. Extrusion apparatus for skim coating plastic material on a sheet of base material comprising a stuffer for advancing the plastic material under pressure, a head on said stuffer having a plurality of orifices for dividing the advancing plastic into a plurality of streams, means for applying a thin film of liquid lubricant to the surfaces of the plastic streams, a plurality of conduits for the plastic streams leading from said orifices, said conduits diverging in spaced relation, a common header for receiving the plastic streams from said spaced conduits and for spreading the plastic out into a flat thin sheet, said header having a long thin orifice from which the flat, thin sheet emerges, a driven pinch roll engaging said orifice, means for adjusting the position of the roll with respect to the orifice at spaced points along the length thereof to control the gauge of the emerging sheet, a second pinch roll cooperating with said first pinch roll for bringing a sheet of base material into engagement with the rubber sheet as it passes before the first mentioned pinch roll, whereby the rubber sheet is skim coated on the sheet of base material.

7. A method of shaping plastic material which comprises advancing the plastic material under pressure through a preliminary die to form a preliminary shaped stream of plastic material, continuously applying a thin film of liquid lubricant to the surface of the plastic stream, said liquid lubricant being miscible with the plastic material, and thereafter passing the lubricated plastic stream through a spreading die to spread it out into a much wider relatively thin shape, while restricting the flow of plastic out of said spreading die, whereby substantial pressure is maintained on the plastic material within the spreading die and a thin shape of uniform thickness is obtained.

8. A method of shaping plastic material which comprises advancing the plastic material under pressure, and distributing said advancing plastic material to a die orifice of relatively great width by dividing the plastic into a plurality of separate advancing streams, continuously applying a thin film of liquid lubricant to the advancing plastic streams, conducting said lubricated advancing streams to spaced points along the die orifice and applying back-pressure to the plastic as it emerges from the die orifice to cause said advancing streams to knit firmly together into a continuous sheet.

9. A method of extruding plastic material into the shape of a relatively thin strip, comprising the steps of forcing a plurality of separate streams of plastic into a common header at separate points, lubricating the surfaces of said streams with a miscible liquid lubricant, spreading said streams in said header and uniting the adjacent edges of said spread strips into a unitary relatively thin strip, lubricating the surfaces of said unitary strip with a thin film of immiscible lubricant, and maintaining the extrusion pressure on said unitary strip for a sufficient period of time to compress said strip into a well defined shape before being discharged from the influence of such pressure.

10. A method of shaping plastic material which comprises advancing the plastic material under pressure, dividing the advancing plastic material into a plurality of streams, continuously applying a thin film of liquid lubricant to the surface of the plastic streams, said lubricant being miscible with the plastic material, causing said streams to diverge in spaced relation, and thereafter passing said lubricated streams into a common spreading die to form a relatively thin shape, while restricting the flow of plastic material out of the spreading die, whereby substantial pressure is maintained on the plastic within the spreading die and a thin shape of accurate thickness is obtained.

11. A method of continuously shaping and vulcanizing rubber stock which comprises advancing vulcanizable rubber stock under pressure, dividing the advancing rubber into a plurality of streams, continuously applying a thin film of liquid lubricant to the surface of the rubber streams, said lubricant being miscible with the plastic material, causing said streams to diverge in spaced relation, and thereafter passing said lubricated streams into a common spreading die to form a relatively thin shape, passing said relatively thin shape through a vulcanizing chamber while confining it in the desired shape under pressure, and while applying an additional thin film of lubricant to the surface of the shape, said lubricant being immiscible with the rubber, heating the rubber in said chamber to vulcanizing temperature, and restricting the flow of the rubber shape from the vulcanizing chamber, whereby substantial pressure is maintained on the rubber in the spreading die and in the chamber.

12. An apparatus for extruding a sheet of plastic comprising a pressure chamber for the plastic material, a plurality of distributing conduits diverging from said chamber, said pressure chamber having baffle means for streamlining and distributing said plastic to said distributing conduits, a plurality of fan shaped conduits, each of said distributing conduits having one end connected to said pressure chamber and the other end connected to one of said fan shaped conduits, a back pressure conduit connected at one end to the larger end of said fan shaped conduit, and said back pressure conduit having transverse cross-section of substantially the shape of the transverse cross-section of the sheet to be extruded.

13. An apparatus for extruding a sheet of plastic material comprising a stuffer for advancing the plastic material under pressure, a head on said stuffer having a plurality of orifices arranged concentrically to the axis of said stuffer, conical means in said head for streamlining and distributing said plastic to the said orifices, means for applying a thin film of liquid lubricant to the surfaces of the plastic streams issuing from said orifices, a plurality of distributing conduits for said plastic streams leading from said orifices, said conduits diverging in spaced relation from said head, a spreading die for receiving the advancing plastic streams from said conduits and for spreading the material out into a relatively thin sheet, and said die having a common thin orifice from which said plastic sheet is discharged.

14. A method of shaping plastic material which comprises forcing the plastic material under pressure through a preliminary die to form a preliminary shaped stream of plastic material, continuously applying a thin film of liquid lubricant to the surface of the plastic stream, and thereafter passing the lubricated plastic stream through a spreading die to spread it out into a relatively thin shape, while restricting the flow of plastic out of said spreading die, whereby substantial pressure is maintained on the plastic material within the spreading die and a thin shape of uniform thickness is obtained.

THOMAS J. RHODES.

REFERENCES CITED

The following references are of record in the file of this patent:

UNITED STATES PATENTS

| Number | Name | Date |
|---|---|---|
| 1,952,469 | Snyder et al. | Mar. 27, 1934 |
| 2,026,740 | Kinsella et al. | Jan. 7, 1936 |
| 2,091,125 | Stewart | Aug. 24, 1937 |
| 2,365,326 | Bailey | Dec. 19, 1944 |
| 2,393,452 | Bailey et al. | Jan. 22, 1946 |
| 2,489,951 | Bump | Nov. 29, 1949 |